United States Patent [19]

Schwab

[11] Patent Number: 4,535,129

[45] Date of Patent: Aug. 13, 1985

[54] HIGH IMPACT GRAFT COPOLYMERS OF METHYL ETHENYL BENZENE ON RUBBER BACKBONE

[75] Inventor: Frederick C. Schwab, Metuchen, N.J.

[73] Assignee: Mobil Oil Corporation, New York, N.Y.

[21] Appl. No.: 348,464

[22] Filed: Feb. 12, 1982

Related U.S. Application Data

[63] Continuation-in-part of Ser. No. 200,116, Oct. 24, 1980, abandoned, which is a continuation-in-part of Ser. No. 870,782, Jan. 19, 1978, abandoned.

[51] Int. Cl.³ ............................................. C08F 279/02
[52] U.S. Cl. ..................................................... 525/316
[58] Field of Search ....................... 525/316; 526/347.1

[56] References Cited

U.S. PATENT DOCUMENTS 3,335,197  8/1967  Wennerberg ...................... 260/669
3,781,384  12/1973  Finestone ............................ 525/316

FOREIGN PATENT DOCUMENTS 1393514  5/1975  United Kingdom .

OTHER PUBLICATIONS

Leitman, Zhur Priklad Khim, vol. 34, No. 8, pp. 1868–1874, Aug. 1961.

Primary Examiner—Paul R. Michl
Attorney, Agent, or Firm—Alexander J. McKillop; Michael G. Gilman; Edward J. Trojnar

[57] ABSTRACT

High impact graft copolymers made from a rubber backbone and having multiple branches of polymeric methyl ethenyl benzene grafted to the backbone are disclosed in which the methyl ethenyl benzene comprises an isomer mixture high in the para-isomer, e.g., at least 85 weight percent.

17 Claims, 1 Drawing Figure

HIGH IMPACT GRAFT COPOLYMERS OF METHYL ETHENYL BENZENE ON RUBBER BACKBONE

CROSS REFERENCE TO RELATED APPLICATIONS

This application is a continuation-in-part of Ser. No. 200,116 filed Oct. 24, 1980, which in turn is a continuation-in-part of Ser. No. 870,782 filed Jan. 19, 1978. These applications, both of which are now abandoned, are incorporated herein by reference in entirety.

U.S. patent applications Ser. Nos. 706,981 filed July 19, 1976, now U.S. Pat. No. 4,086,287 and Ser. No. 801,177, filed May 27, 1977, now abandoned, by Warren W. Kaeding and Lewis B. Young, disclose a selective alkylation process and mixtures of isomeric ethyl toluenes which may be catalytically dehydrogenated to obtain the isomeric methyl ethenyl benzenes used in preparing the graft copolymers of this invention.

BACKGROUND OF THE INVENTION

Styrene has long been used in the manufacture of impact polymers and such polymers have attained a large market for many purposes. Alkylated styrenes such as alpha-methylstyrene have also been of interest for certain purposes. Similarly, nuclear alkyl substituted styrenes have been used in various applications. The monomer which has been principally used is known as vinyltoluene. This is a mixture which consists mainly of meta- and para-methyl styrenes (vinyl toluenes) produced by the catalytic dehydrogenation of a mixture of the corresponding m- and p-ethyltoluenes. The ethyltoluene mixture is itself obtained by the fractional distillation of a mixture of the o-, m- and p-ethyltoluenes. The ratio of the m- and p- isomers in the monomer mixture is approximately 65:35 (m:p). A convenient summary of the preparation and properties of the monomer mixture and of polymers produced from it is given in "Styrene: Its Polymers, Copolymers and Derivatives" Ed. R. H. Boundy, R. F. Boyer, ACS Monograph Series, 1952, Hafner Publishing Company, pages 1232 to 1245.

SUMMARY OF THE INVENTION

High impact graft copolymers with advantageous properties are prepared from a mixture of isomeric methyl ethenylbenzenes having a particular isomeric distribution. The polymerizable isomeric mixture consists essentially of the m- and p-isomers of methyl ethenyl benzene, containing at least about 15 percent p-isomer. The mixture is substantially devoid of the o- isomer; when the o-isomer is present, the amount of it is less than 0.1% based on the total weight of the isomer mixture.

BRIEF DESCRIPTION OF THE DRAWING

The FIGURE is a graph comparing the spiral flow of the impact polymer of this invention to that of impact polystyrene at various temperatures.

DETAILED DESCRIPTION OF THE INVENTION

Figure 1:
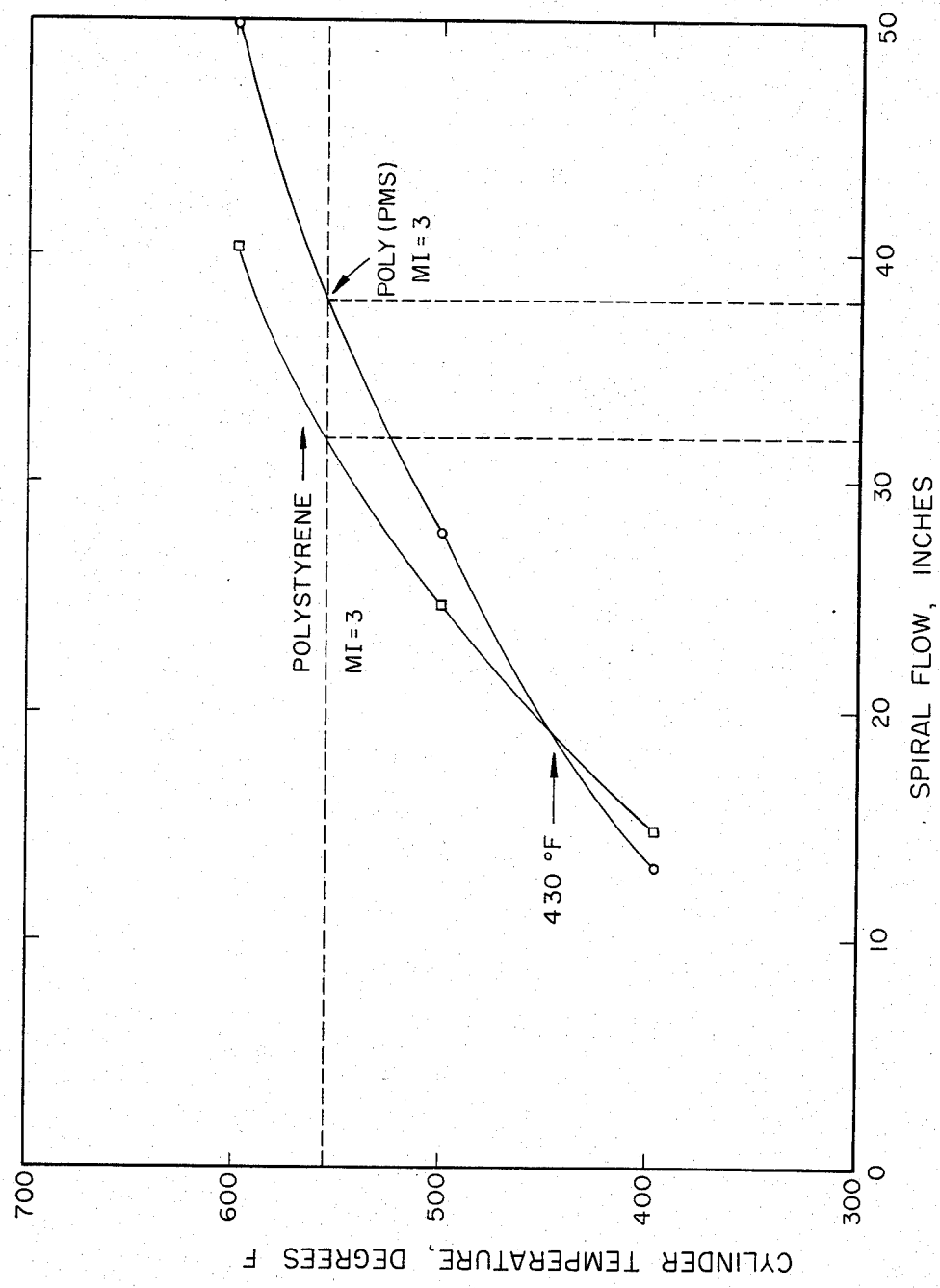

The impact polymers of this invention are prepared by polymerizing a methyl ethenyl benzene isomer mixture in the presence of a rubbery polymer under conditions which favor grafting. The ratio of the isomers in the mixture is as follows:

| Isomer | Wt. Percent |
| --- | --- |
| 1-methyl-2-ethenyl benzene | Less than 0.1, preferably less than 0.05 |
| 1-methyl-3-ethenyl benzene | Less than 15, preferably less than 10. |
| 1-methyl-4-ethenyl benzene | 85–99 preferably at least 90. |

Generally, the proportion of the p-isomer (1-methyl-4-ethenyl benzene) will be at least 95 weight percent with the m-isomer (1-methyl-3-ethenyl benzene) constituting less than 5 weight percent of the mixture. Particularly preferred mixtures contain 97 to 99 weight percent of the p-isomer and 1 to 3 weight percent of the m-isomer.

The isomer mixture may contain impurities in addition to the methyl ethenyl benzenes. Generally, these other materials will not constitute more than 1 percent by weight of the total mixture. These other materials derive essentially from the process used to make the methyl ethenyl benzenes.

A typical isomer mixture has the following analysis, by weight, determined by gas chromatography:

| | | |
| --- | --- | --- |
| Total vinyl benzenes | | 99.41 |
| Residue: | | |
| Ethyl toluene | 0.10 | |
| Mesitylenes etc. | 0.15 | |
| Non-vinylic higher boilers | 0.34 | |
| | 0.59 | 0.59 |
| | | 100.00 |
| Vinyl benzenes: | | |
| 1-methyl-2-ethenyl benzene | | 0.05 |
| 1-methyl-3-ethenyl benzene | | 2.6 |
| 1-methyl-4-ethenyl benzene | | 97.4 |

The mixture of the isomeric methyl ethenyl benzenes may be obtained by the catalytic dehydrogenation of a mixture of the corresponding ethyl toluenes, which in turn may be obtained by the selective alkylation process disclosed and claimed in U.S. patent applications Ser. Nos. 706,981, filed July 19, 1976, now U.S. Pat. Nos. 4,086,287 and 801,177, filed May 27, 1977, now abandoned by Warren W. Kaeding and Lewis B. Young, the disclosures of which are incorporated herein by reference.

In general, the polymerization conditions appropriate to the preparation of impact copolymers with styrene will also be useful with the methyl ethenyl benzene mixture to prepare the impact polymers of this invention.

The higher glass transition temperature $T_G$ of the impact polymers, as compared to impact polymers prepared from styrene, is a significant advantage. The impact polymers prepared from the specified isomer mixtures are also notable for a higher Vicat softening temperature than the corresponding impact polymers prepared with styrene. Vicat softening temperature is measured by ASTM method D-1525.

It has further been unexpectedly demonstrated that the impact polymers according to this invention exhibit a higher flow as a function of temperature compared to corresponding impact polystyrene polymers. Specifically, p-methyl ethenyl benzene impact polymers can be made with sufficiently high molecular weight to impact excellent physical properties without concomitant loss of good flow characteristics. As a result, the impact polymers of this invention can be fabricated by injection molding into articles which have physical properties equal to or surpassing articles molded from impact polystyrene and the molding can be accomplished at a significantly faster rate.

The high impact copolymers of this invention are copolymers produced by grafting units derived from the polymerizable mixture onto a backbone polymer which is generally of a rubbery nature. Suitable backbone polymers include polybutadiene, poly(dimethyl butadiene), polyisoprene, polychloroprene and other synthetic rubbers such as the styrene-butadiene rubbers (SBR) ethylene-propylene rubbers (EPR), ethylene-propylene-diene elastomers, polyacrylates, nitrile rubbers and copolymers with other aromatic monomers including vinyl toluene. The backbone will generally comprise 2 to 25 percent by weight of the high impact copolymer, preferably 3 to 10 percent by weight. Normal techniques, e.g. grafting, comparable to those used for making high impact polystyrenes are useful; they are well known in the art and referred to, for example, in U.S. Pat. No. 2,694,692 and British Pat. No. 1,054,301, which are incorporated herein by reference.

The high impact copolymers derived from ethylene-propylene-diene elastomers are particularly advantageous in their high temperature stability and weatherability. The copolymers produced from polyisoprene have exceptionally high impact strengths as shown by their Izod impacts. Furthermore, the high impact copolymers according to the present invention are more translucent in thin sections than similar high impact polystyrenes. This is probably because the refractive index of the present polymers is closer to that of the backbone polymers than that of polystyrene. A typical comparison of properties is given in Table 1 below. The samples were high impact materials containing 4.89 phm (parts per hundred monomer) of cis-polybutadiene.

TABLE 1

High Impact Materials

|  | Styrene | Methyl Ethenyl Benzene |
|---|---|---|
| Tensile Modulus, psi | 241,000 | 255,000 |
| Yield Strength, psi | 3,500 | — |
| Break Strength, psi | 3,320 | 3,710 |
| Elongation, % | 14 | 7.1 |
| Izod Impact (Ft-lbs/in) | 1.3 | 2.10 |
| Vicat Softening, °C. | 100.5 | 108 |
| % Transmission | 77.0 | 83.8 |
| Density | 1.04 | 1.01 |

The following Examples are given in order that the invention may be more fully understood. Proportions and percentages are given by weight. The mixture of isomeric methyl ethenyl benzenes used in all the examples is as follows.

| Methyl ethenyl benzenes | 99.43 |
|---|---|
| Ethyltoluene | 0.53 |
| Xylenes, cumenes, mesitylenes | 0.01 |
| High boiling materials | 0.03 |
| Methyl ethenyl benzenes: | |
| 1-methyl-2-ethenyl benzene | —(1) |
| 1-methyl-3-ethenyl benzene | 97.0 |
| 1-methyl-4-ethenyl benzene | 3.0 |

Note: (1)Less than 0.05%.

EXAMPLE 1

Preparation of a high impact material with an ethylene-propylene- diene elastomer (EPDM).

A quantity of 220 g the mixture of methyl ethenyl benzenes described above, 1.1 g mineral oil ("Nujol") and 11.0 g EPDM ("Royalene 515-trade mark) (EPDM) were added to a 1 liter reactor equipped with a stirrer and allowed to dissolve. A quantity of 0.071 g of azobisisobutyronitrile was added and the temperature raised to 90° and the stirring speed at 350 rpm. After heating for 2 hours at 90° C., 0.108 g benzoyl peroxide was added and the stirring increased to 450 rpm. After 3½ hours heating at 90° C., 0.07 ml t-dedecylmercaptan, 0.135 g t-butyl-perbenzoate and 1.582 g t-butylperoctoate were added. After a few minutes mixing, an aqueous solution at 90° C., consisting of 320 ml distilled water, 0.59 g Gelvatol 20–90 (surfactant) and 1.35 g sodium chloride, was added and the stirring speed was increased to 550 rpm, the temperature was raised to 94° C. and held for 16 hr. The temperature was then raised to 96° C. and held for an additional 24 hours.

After the polymerization, the product was collected as small beads, dried and tested.

Test results were as follows: Izod Impact—1.14 ft-lb/in, Tensile Modulus—239, 000 psi, Break Strength—3970 psi, Melt Index—3.40 g/10 minutes. Vicat Softening temperature—104° C., Transmission—60.8%.

EXAMPLE 2

Preparation of a high impact copolymer with polyisoprene.

A quantity of 220 g of the mixture of Example 1, 1.1 g mineral oil ("Nujol") and 11.0 g polyisoprene (Ameripol 600) were added to a 1 liter reactor equipped with stirring and allowed to dissolve. A quantity of 0.071 g of azobisisobutyronitrile was added and the temperature was raised to 90° C. and the reaction was stirred at 350 rpm. After 2 hours heating at 90° C., 0.108 g of benzoyl peroxide was added at 90° C. and the stirring increased to 450 rpm. After 3 hr 30 min at 90° C., 0.07 ml of t-dodecylmercaptan, 0.135 g t-butylperbenzoate and 1.582 g of t-butylperoctoate were added. After a few minutes mixing, an aqueous solution at 90° C. consisting of 320 ml distilled water, 0.59 (polyvinyl alcohol) (Gelvatol 20–90) and 1.35 sodium chloride was added to the prepolymer. The stirring speed was raised to 550 rpm, and the temperature increased to 94° C. and the reaction allowed to proceed overnight, the following day, the temperature was raised to 96° C. and allowed to proceed for an additional 24 hr.

After the polymerization, the product was collected as small beads, dried and tested.

The test results were as follows: Izod Impact—1.90 ft-lb/in, Tensile Modulus—241,000, Break Strength—3260, Vicat Softening 100° C., Melt Index—3.83 g/10 min. Transmission=81.7%.

EXAMPLE 3

Preparation of a high impact copolymer with nitrile rubber.

A quantity of 200 g of the mixture of Example 1, 1.1 g ("Nujol"), and 11.0 g nitrile rubber ("Paracril 3300"—trade mark) was added to a 1-liter reactor equipped with stirring and allowed to dissolve. A quantity of 0.071 g of azo-bisisobutyronitrile was added and the temperature was raised to 90° C. and 350 rpm. After 2 hr heating at 90° C. and 350 rpm, 0.108 g of benzoyl peroxide was added and the reaction allowed to continue. After 3 hr 30 min at 90° C., 0.07 ml of t-dodecylmercaptan, 0.135 gm. t-butylperbenzoate and 1.582 gm. t-butyl peroctoate were added. After a few minutes mixing, an aqueous solution at 90° C. consisting of 320 ml distilled water, 0.59 grams (polyvinylalcohol) (Gelvatol 20–90) and 1.35 g sodium chloride was added to the prepolymer and the stirring speed was increased to 550 rpm and the temperature increased to 94° C. The reaction was allowed to proceed for 16 hr at 94° C. and the temperature was raised to 96° C. for an additional 24 hr.

After the polymerization, the product was collected as small beads, dried and tested.

Test results were as follows: Izod Impact—0.79 ft-lb/in, Tensile Modulus—288,000 psi, Break Strength—5220 psi, Melt Index=2.45 g/10 min Transmission=83.4%, Vicat and Softening Point—106° C.

EXAMPLE 4

Preparation of a high impact copolymer with polybutadiene.

A quantity of 226 g of the mixture of Example 1, 1.1 g mineral oil ("Nujol") and 11.0 g of polybutadiene (Taktene 1202) were added to a 1 liter reactor and allowed to dissolve. A quantity of 0.071 g of azobisisobutyronitrile was added and the temperature raised to 90° C. Stirring speed was set at 300 rpm. After 2 hr at 90° C. and 300 rpm, 0.108 g of benzoyl peroxide was added and the reaction was continued at 90° C. and 300 rpm. After 4 hr 25 min after the start, 0.05 ml of t-dodecylmercaptan 0.150 g t-butylperoctoate, and 0.135 g of t-butylperbenzoate were added at 90° C., 300 rpm. After a few minutes of mixing, a water solution (320 ml) containing 0.59 g of polyvinyl alcohol (Gelvatol 20–390) and 1.35 g of sodium chloride was added at 90° C. to the polymer mix. The stirring speed was increased to 600 rpm and the temperature raised to 94° C. The suspended polymer was allowed to react for 16 additional hr at 94° C.

The final product was recovered in the form of small beads which were subsequently molded and tested.

The test results were as follows: Izod Impact—2.10 ft-lb/in, Tensile Modules.255,000 psi, Break Strength—3710 psi, Melt Index—1.10 g/10 min, Vicat Softening Temp.—108° C., density=1.01 g/cc, and transmission=83.8%.

This copolymer is notable for its high softening temperature, low density and high transparency.

EXAMPLE 5

Preparation of a high impact copolymer from acrylonitrile/butadiene/methyl ethenyl benzene.

Into a clean, dry, nitrogen-purged, three liter, four neck, round bottom flask was charged 272.7 g of polybutadiene latex (Polysar PL-662) (55% polybutadiene). The flask was fitted with a stirrer, thermometer, reflux condenser and 1000 ml addition funnel. A solution was prepared by mixing 12.0 g sodium stearate, 0.9 g sodium bicarbonate, 1.5 g sodium hydroxide, 3.0 g potassium persulfate and 1322 g deionized water. The mixture was heated to 60° C. while stirring until a clear, hommogeneous solution was obtained. This solution was then charged into the reaction flask to dilute the stirred polybutadiene latex. A solution containing 435.6 g of the mixture of Example 1, 164.4 g acrylonitrile and 2.7 g tert-dodecyl mercaptan was prepared and placed in the addition funnel. With stirring and the charge temperature controlled at 60° C., monomer addition was started and maintained at 0.5%/min. After all the monomer had been added, polymerization was allowed to proceed for one additional hour. The latex was sampled to determine conversion by measuring total solids content. Antioxidant was added to the latex in the form of 42 g of an 18% emulsion containing 2/1—TNPP/Irganox 1076.

The ABPMS was recovered by pouring the hot, filtered latex into four volumes of rapidly stirred, 1.5% aqueous $CaCl_2$ solution at 100° C. The crumb was filtered and hot water washed. The crumb was vacuum-dried for 40 hours at 85° C. with a slow nitrogen sweep through the oven.

Conversion was over 95%. Precoagulum present in the latex was less than one percent, based on total resin. The yield of resin was about 740 g. Injection molded samples, prepared by direct mold of the dried resin crumb, had notched Izod Impact Strength of 6.3 ft. lb/in.

The product is suitable for extrusion or injection molding to form hard, tough, impact-resistant articles such as drain pipe or appliance housings.

EXAMPLE 6

Samples of high impact polymers having the same melt index of 3 were prepared in the conventional manner from 10 weight percent of a high-cis polybutadiene rubber (Taktene 1202 from Polysar) and 85 weight percent of p-methyl ethenyl benzene and styrene, respectively. Mold fill capability measured as inches of fill in a spiral flow mold was plotted as a function of temperature in FIG. 1. At typical injection molding temperatures of about 260° C. (500° F.) and above the impact polymer of this invention exhibits 10–20 percent greater mold-fill capability than impact polystyrene of the same melt index.

What is claimed is:

1. A high impact copolymer comprising a preformed backbone polymer chain and multiple branches of polymeric methyl ethenyl benzene grafted to the backbone polymer, said polymeric methyl ethenyl benzenes being derived from a polymerizable mixture of isomers of methyl ethenyl benzene consisting essentially of:

1-methyl-4-ethenyl benzene, at least 85 weight percent;

1-methyl-3-ethenyl benzene, less than 15 weight percent; and 1-methyl-2-ethenyl benzene, 0 to 0.1 weight percent;

said copolymer having greater flow, at injection molding temperatures of 260° C. and above, than the corresponding high impact copolymer of the same Melt Index in which styrene is the grafted monomer instead of said isomers of methyl ethenyl benzene.

2. The copolymer of claim 1 in which the isomers are present in the mixture in the following proportions by weight:

1-methyl-2-ethenyl benzene 0 to 0.1%
1-methyl-3-ethenyl benzene 1 to 10%
1-methyl-4-ethenyl benzene at least 90%.

3. The copolymer of claim 1 in which the isomers are present in the mixture in the following proportions by weight:

1-methyl-2-ethenyl benzene 0 to 0.05%
1-methyl-3-ethenyl benzene 1 to 5%
1-methyl-4-ethenyl benzene at least 95%.

4. The copolymer of claim 1 in which the isomers are present in the mixture in the following proportions by weight:

1-methyl-2-ethenyl benzene 0 to 0.05%
1-methyl-3-ethenyl benzene 1 to 3%
1-methyl-4-ethenyl benzene at least 97%.

5. The copolymer of claim 1 in which the backbone polymer chain is a polymer of polybutadiene, a styrene-butadiene rubber, an ethylene-propylene rubber, an ethylene-propylene-diene elastomer, or a nitrile rubber.

6. The copolymer of claim 2 in which the backbone polymer chain is a polymer of polybutadiene, a styrene-butadiene rubber, an ethylene-propylene rubber, an ethylene propylene-diene elastomer, or a nitrile rubber.

7. The copolymer of claim 3 in which the backbone polymer chain is a polymer of polybutadiene, a styrene-butadiene rubber, an ethylene-propylene rubber, an ethylene-propylene-diene elastomer, or a nitrile rubber.

8. The copolymer of claim 4 in which the backbone polymer chain is a polymer of polybutadiene, a styrene-butadiene rubber, an ethylene-propylene rubber, an ethylene-propylene-diene elastomer, or a nitrile rubber.

9. The copolymer of claim 5 in which the backbone polymer comprises 3 to 10 percent by weight of the total copolymer.

10. The copolymer of claim 6 in which the backbone polymer comprises 3 to 10 percent by weight of the total copolymer.

11. The copolymer of claim 7 in which the backbone polymer comprises 3 to 10 percent by weight of the total copolymer.

12. The copolymer of claim 8 in which the backbone polymer comprises 3 to 10 percent by weight of the total copolymer.

13. The copolymer of claim 1 in which the backbone polymer chain is a polymer of polybutadiene.

14. The copolymer of claim 2 in which the backbone polymer chain is a polymer of polybutadiene.

15. The copolymer of claim 3 in which the backbone polymer chain is a polymer of polybutadiene.

16. The copolymer of claim 4 in which the backbone polymer chain is a polymer of polybutadiene.

17. In a process for injection molding high impact polymers the improvement comprising using the high impact copolymer of claim 1.

* * * * *